US012654870B1

(12) United States Patent
Eddy et al.

(10) Patent No.: US 12,654,870 B1
(45) Date of Patent: Jun. 16, 2026

(54) CONTROL SERVO

(71) Applicant: Textron Aviation Inc., Wichita, KS (US)

(72) Inventors: Stephen Michael Eddy, Benton, KS (US); Justin Scott Jirik, Goddard, KS (US)

(73) Assignee: Textron Aviation Inc., Wichita, KS (US)

( * ) Notice: Subject to any disclaimer, the term of this patent is extended or adjusted under 35 U.S.C. 154(b) by 0 days.

(21) Appl. No.: 19/035,286

(22) Filed: Jan. 23, 2025

(51) Int. Cl.
| | |
|---|---|
| *B64D 31/14* | (2006.01) |
| *F02C 9/00* | (2006.01) |
| *B64C 13/22* | (2006.01) |
| *B64C 13/28* | (2006.01) |
| *B64D 31/04* | (2006.01) |

(52) U.S. Cl.
CPC ............... *B64D 31/14* (2013.01); *F02C 9/00* (2013.01); *B64C 13/22* (2013.01); *B64C 13/345* (2018.01); *B64D 31/04* (2013.01)

(58) Field of Classification Search
CPC ..... B64D 31/14; B64C 13/507; B64C 13/506; B64C 13/505; B64C 13/46; B64C 13/44; B64C 13/42; B64C 13/345; B64C 13/343; B64C 13/341; B64C 13/30; B64C 13/22; B64C 27/56; B64C 27/58; G05G 1/082
See application file for complete search history.

(56) References Cited

U.S. PATENT DOCUMENTS

| | | | | |
|---|---|---|---|---|
| 3,665,278 A * | 5/1972 | Kazmarek | ............ | G05D 3/1445 192/142 R |
| 4,765,568 A * | 8/1988 | Carl | ...................... | B64C 13/505 244/99.4 |
| 6,400,352 B1 * | 6/2002 | Bruneau | .................. | G09B 9/28 345/161 |
| 7,044,024 B1 * | 5/2006 | Younkin | ................ | B64C 13/24 180/65.1 |
| 8,742,711 B2 * | 6/2014 | Hanlon | ................ | B64C 13/507 318/575 |
| 11,254,420 B2 * | 2/2022 | Antraygue | .............. | B64C 13/22 |
| 2024/0418294 A1 * | 12/2024 | Mornacchi | .............. | B64C 27/64 |

FOREIGN PATENT DOCUMENTS

| | | | | |
|---|---|---|---|---|
| KR | 100545920 B1 * | 1/2006 | ............. | B64C 25/50 |

* cited by examiner

Primary Examiner — Richard Green
(74) Attorney, Agent, or Firm — Hovey Williams LLP

(57) ABSTRACT

A control servo for an aircraft engine control system, the control servo broadly comprising a housing, a stepper motor, a drivetrain, an output shaft, and an output lever. The housing includes a drivetrain chamber, a drive opening, and an output opening. The stepper motor includes a drive shaft extending through the drive opening into the drivetrain chamber. The drivetrain is at least partially positioned in the drivetrain chamber. The output shaft extends through the output opening from the drivetrain chamber. The drivetrain drivably connects the drive shaft and output shaft. The output lever includes an output lever arm and a friction interface. The output lever arm has opposing proximal and distal ends and is connected to the output shaft near the proximal end. The friction interface is near the proximal end and configured to be adjusted to set a slip friction threshold between the output lever and the output shaft.

20 Claims, 4 Drawing Sheets

CONTROL SERVO

BACKGROUND

Conventional control servos for aircraft engine control systems utilize small direct current (DC) motors with high gear ratio gear-based drivetrains. Such control servos have high backdrive forces and exhibit backlash, which can be felt by pilots manually manipulating engine controls. Many existing servos do not have override protection to allow back-drive after mechanical failures within the gear-train. These control servos are also large and thus require premium installation space, which is a significant disadvantage in the field of aircraft engine control systems. Furthermore, these control servos are quite difficult and costly to manufacture.

SUMMARY

The present invention solves the above-described problems and other problems by providing a control servo with low to zero backlash and low passive state backdrive forces along with an adjustable friction output level interface to allow override after any motor or drive-train failure. Furthermore, the control servo is compact with several components being formed via additive manufacturing.

An embodiment of the invention is a control servo for an aircraft engine control system. The control servo broadly comprises a housing, a stepper motor, a drivetrain, an output shaft, an output lever, and an output lever position sensor. The housing includes a drivetrain chamber, a drive opening, and an output opening. The stepper motor includes a drive shaft extending through the drive opening into the drivetrain chamber. The drivetrain is at least partially positioned in the drivetrain chamber. The output shaft extends through the output opening from the drivetrain chamber. The drivetrain drivably connects the drive shaft and output shaft. The output lever includes an output lever arm and a friction interface. The output lever arm has opposing proximal and distal ends and is connected to the output shaft near the proximal end. The friction interface is near the proximal end and is configured to be adjusted to set a slip friction threshold between the output lever and the output shaft. A position sensor interfaces to the proximal end of the output arm, along the arms rotational axis.

Another embodiment is a control servo for an aircraft engine control system, the control servo broadly comprising a housing, a stepper motor, a drivetrain, an output shaft, and an output lever. The housing includes a drivetrain chamber, a drive opening, and an output opening. The drive opening and the output opening lead to the drivetrain chamber. The stepper motor includes a drive shaft configured to extend through the drive opening into the drivetrain chamber. The drivetrain is at least partially positioned in the drivetrain chamber and includes a number of wheels connected by belts. Specifically, a first wheel is configured to be connected to the drive shaft so as to be rotatable therewith. A second wheel is spaced from the first wheel. A third wheel is positioned near the second wheel and configured to be rotatable therewith. A fourth wheel is spaced from the third wheel. A first belt drivably connects the first wheel and the second wheel. A second belt drivably connects the third wheel and the fourth wheel. The output shaft is configured to extend through the output opening from the drivetrain chamber and configured to be connected to the fourth wheel so as to be rotatable therewith. The drivetrain is configured to drivably connect the drive shaft and the output shaft with no backlash between the drive shaft and the output shaft. The output lever is configured to be connected to the output shaft so as to be rotatable therewith.

Another embodiment of the invention is a control servo for an aircraft engine control system. The control servo broadly comprises a housing, a stepper motor, a drivetrain, an output shaft, an output lever, and a friction interface. The housing includes a drivetrain chamber and a drive opening and an output opening leading to the drivetrain chamber. The stepper motor includes a drive shaft configured to extend through the drive opening into the drivetrain chamber. The drivetrain is at least partially positioned in the drivetrain chamber and includes a number of wheels and a number of belts. A first wheel is configured to be connected to the drive shaft so as to be rotatable therewith. A second wheel is spaced from the first wheel. A third wheel is positioned near the second wheel and is configured to be rotatable therewith. A fourth wheel is spaced from the third wheel. A first belt drivably connects the first wheel and the second wheel. A second belt drivably connects the third wheel and the fourth wheel. The output shaft is configured to extend through the output opening from the drivetrain chamber and is configured to be connected to the fourth wheel so as to be rotatable therewith. The drivetrain is configured to drivably connect the drive shaft and the output shaft with no backlash between the drive shaft and the output shaft. The output lever includes an output lever arm and a friction interface. The output lever arm has opposing proximal and distal ends and is configured to be connected to the output shaft near the proximal end so as to be rotatable with the output shaft. The friction interface is near the proximal end and is configured to be adjusted to set a slip friction threshold between the output lever and the output shaft. The slip friction threshold can be set to between approximately five pounds and approximately seven pounds of force. The drivetrain is configured to be locked in place for testing the slip friction threshold between the output lever and the output shaft. The housing includes a first aperture, the fourth wheel includes a second aperture, and the first aperture and the second aperture are configured to be aligned for receiving a locking member therethrough for locking the drive train.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current invention are described in detail below with reference to the attached drawing figures, wherein.

Figure 1:
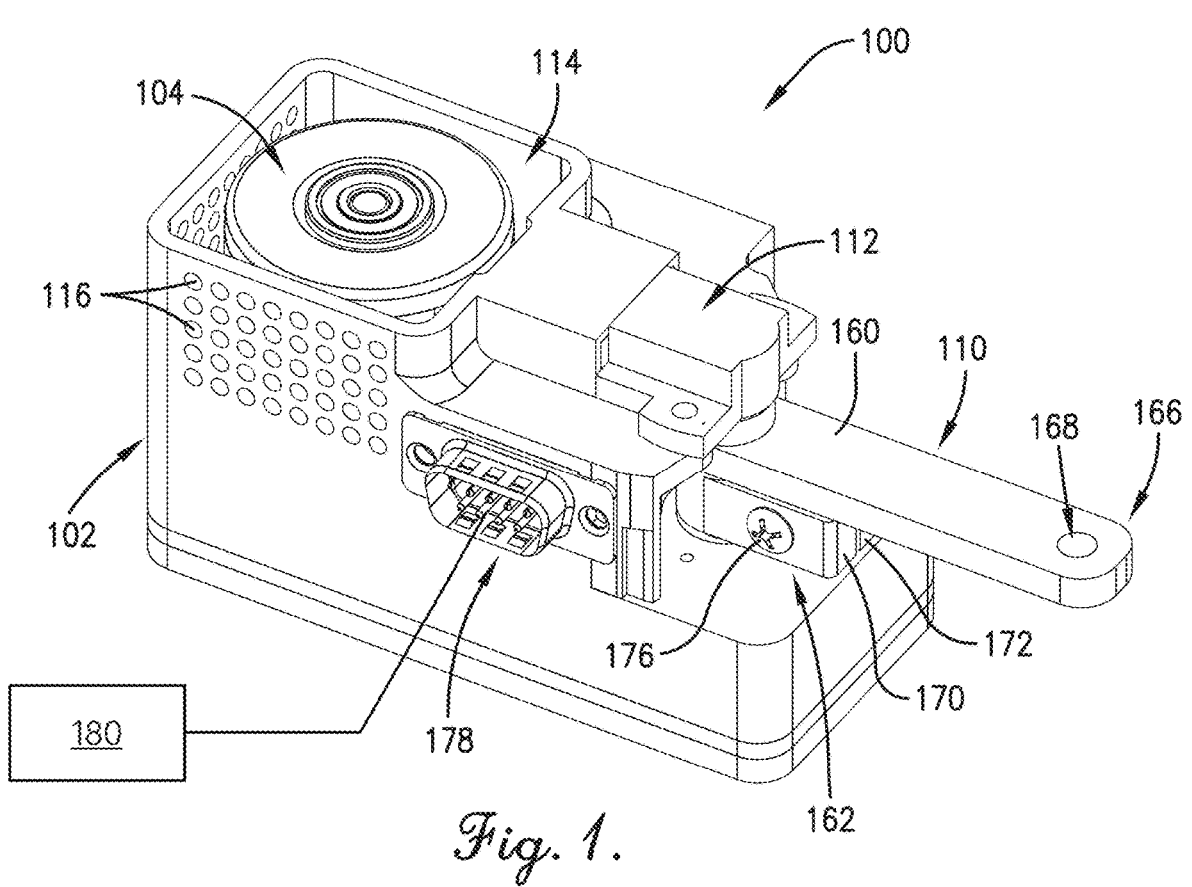
FIG. 1 is a perspective view of a control servo constructed in accordance with an embodiment of the invention.

The drawing figures do not limit the current invention to the specific embodiments disclosed and described herein.

The drawings are not necessarily to scale, emphasis instead being placed upon clearly illustrating the principles of the invention.

DETAILED DESCRIPTION OF THE INVENTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Turning to the drawing figures, a control servo 100 constructed in accordance with an embodiment of the invention will now be described in detail. The control servo 100 may be particularly utilized in aviation. However, the control servo 100 may also be used in any setting that requires mechanical control outputs. The control servo 100 broadly comprises a housing 102, a stepper motor 104, a drivetrain 106, an output shaft 108, an output lever 110, and a position sensor 112.

The housing 102 may enclose at least portions of the drivetrain 106 and may include a motor cavity 114, a plurality of airflow apertures 116, a drivetrain chamber 118, a drive opening 120, an output opening 122, a cover 124, and a bearing plate 126. The housing 102 (including the cover 124 and the bearing plate 126) may be formed via additive manufacturing or conventional machining and may be formed of any suitable material such as various plastics. In one embodiment, at least portions of the housing is formed of 9085 Ultum® resin.

The motor cavity 114 may be configured to at least partially receive the stepper motor 104 therein. In one embodiment, the motor cavity 114 may be on an opposite side of the housing 102 as the drivetrain chamber 118.

The airflow apertures 116 may be small openings in a sidewall of the housing 102 near the motor cavity 114. The airflow apertures 116 may permit air to circulate around the stepper motor 104 for maintaining a suitable temperature of the stepper motor 104.

Figure 4:
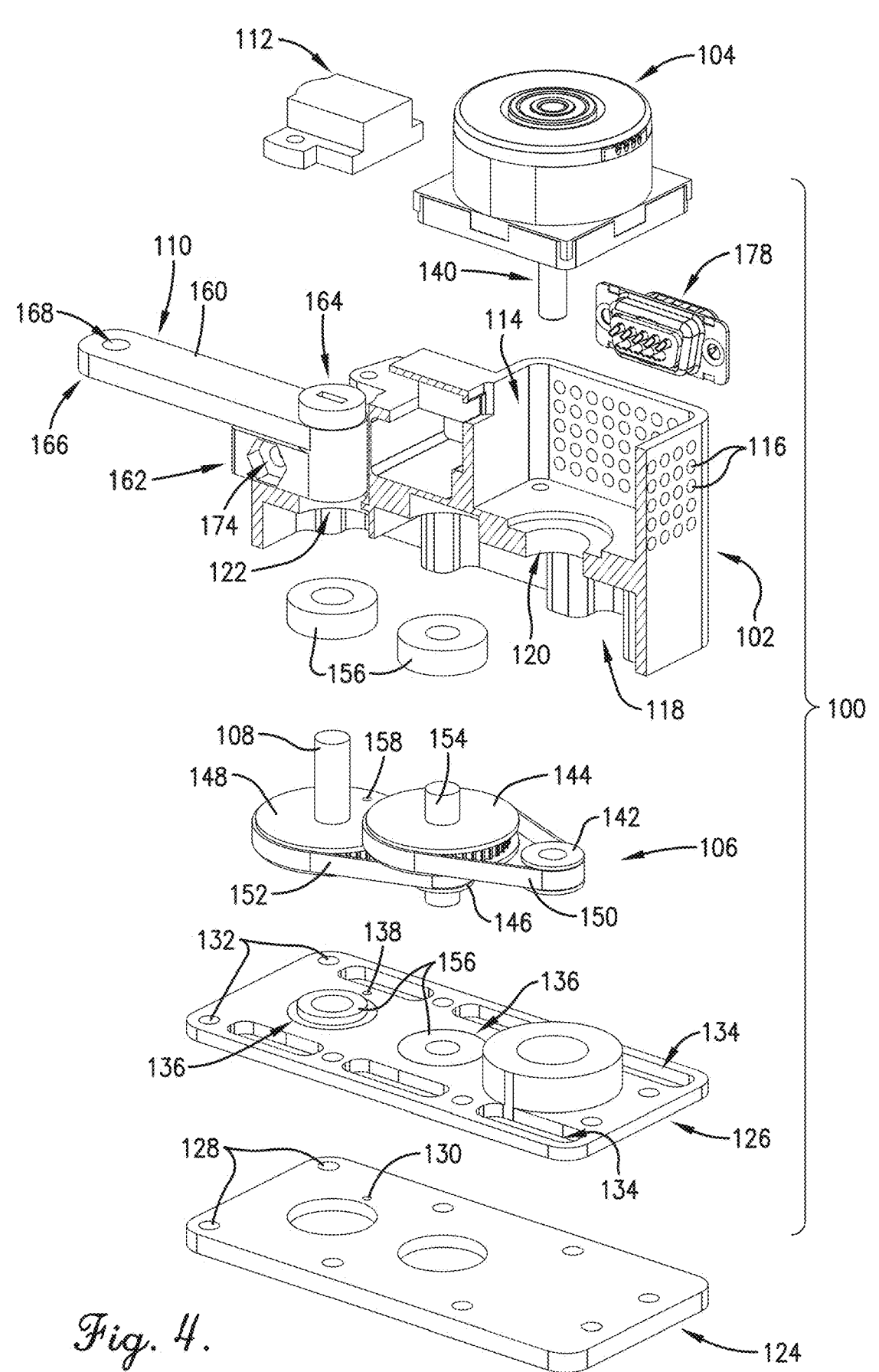
FIG. 4 is an exploded perspective view of the control servo of FIG. 1.
Figure 5:
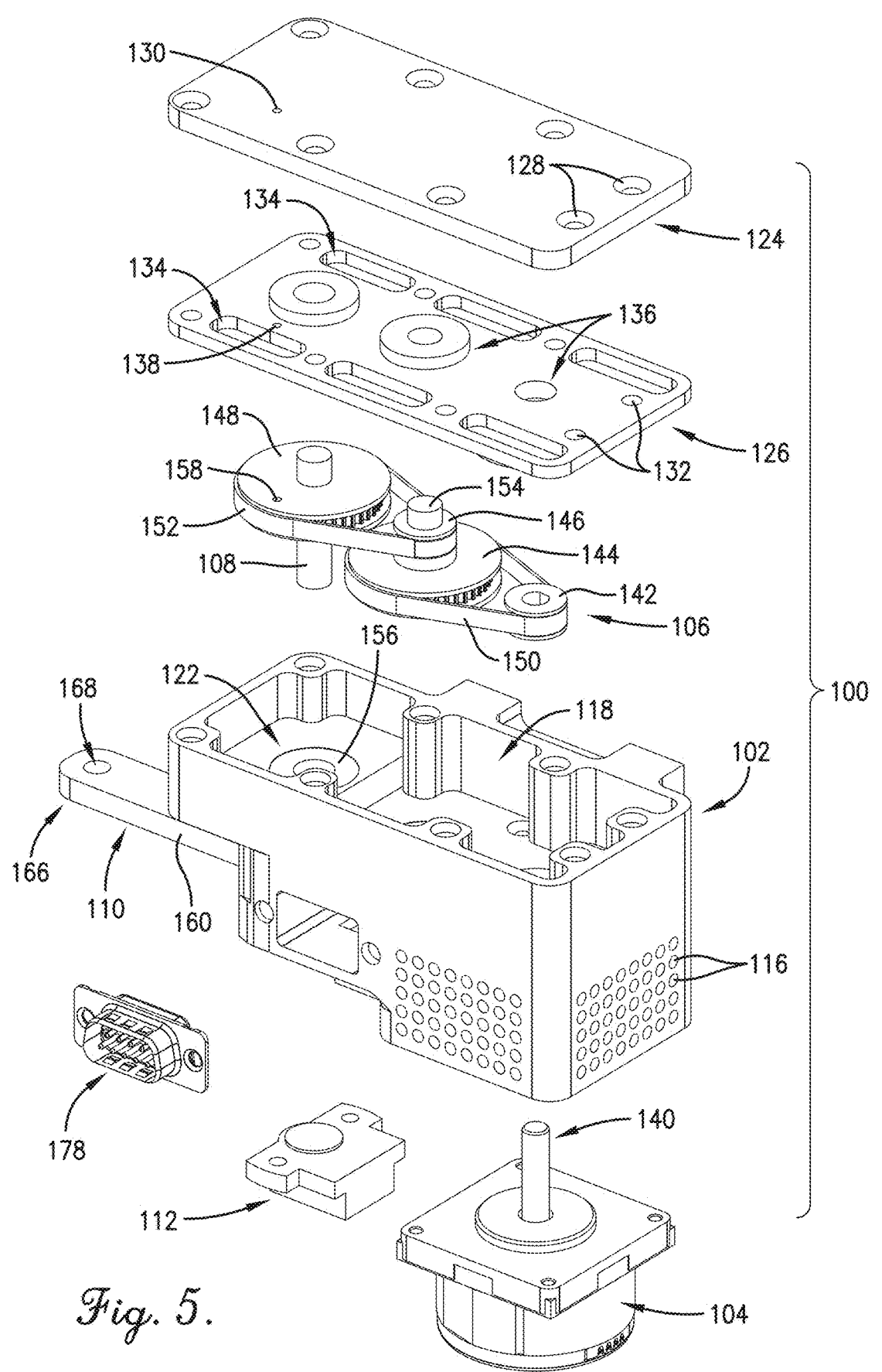
FIG. 5 an inverted perspective view of the control servo of FIG. 1.

As best seen in FIGS. 4 and 5, the drivetrain chamber 118 may house components of the drivetrain 106 such as wheels, belts, shafts, and bearings (described below. The drivetrain chamber 118 may include the drive opening 120 and the output opening 122 and may be enclosed (and accessible) by the cover 124. The drive opening 120 receives the drive shaft 140 therethrough and may seat a bearing. Similarly, the output opening 122 receives the output shaft 108 therethrough and may seat a bearing.

The cover 124 may enclose the drivetrain chamber 118 and may include fastener through-holes 128 for receiving fasteners therethrough and a locking aperture 130. The locking aperture 130 may be configured to align with other locking apertures for locking the drivetrain 106 in place, the purpose of which will be described below.

The bearing plate 126 may help support the drivetrain 106 and may include a plurality of fastener through-holes 132 for receiving fasteners therethrough, a plurality of assembly slots 134, a plurality of bearing apertures 136, and a locking aperture 138.

The assembly slots 134 may be positioned near sides of the bearing plate 126 to facilitate assembling the control servo 100. In one embodiment, the bearing plate 126 includes three of the assembly slots 134 near each longitudinal side of the bearing plate 126.

The bearing apertures 136 receive at least some bearings (e.g., bearings 156 described below) therein. To that end, the bearing apertures 136 may be configured to align with some of the wheels of the drivetrain 106. The locking aperture 138 may be configured to align with the locking aperture 130 of the cover 124 and a locking aperture of a wheel of the drivetrain 106 for locking the drivetrain 106, the purpose of which will be described below.

The stepper motor 104 may include a drive shaft 140 and may be positioned at least partially in the motor cavity 114 of the housing 102. The stepper motor 104 may be any suitable stepper motor and may be communicatively connected to and controlled by a controller (e.g., controller 180, depicted in FIG. 1), processor, or the like such as a printed circuit board (PCB). The stepper motor 104 may have a $\frac{1}{4}^{th}$ step resolution or any other suitable resolution. Other motors, particularly motors that can mimic or approximate behavior of a stepper motor, may be used.

The drive shaft 140 may extend from the stepper motor 104 through the drive opening 120 into the drivetrain chamber 118. The drive shaft 140 may be connected to a first wheel of the drivetrain 106 as discussed below.

As best seen in FIGS. 4 and 5, the drivetrain 106 may be at least partially positioned in the drivetrain chamber 118 of the housing 102 and may drivably connect the drive shaft 140 of the stepper motor 104 to the output shaft 108. The drivetrain 106 may include a plurality of wheels 142, 144, 146, 148, a plurality of belts 150, 152, an intermediate shaft 154, and a plurality of bearings 156. The drivetrain 106 may provide a six to one gear ratio from the drive shaft 140 to the output shaft 108 or any other suitable gear ratio. The drivetrain 106 may have no backlash (i.e., zero backlash), which may particularly be achieved via the use of the belts 150, 152 instead of gears or other slip-prone drivetrain components.

The first wheel 142 may be connected to the drive shaft 140 to rotate therewith. The first wheel 142 may be drivably connected to the second wheel 144 via the first belt 150 and may have a radius smaller than a radius of the second wheel 144 to effect a first gearing stepdown in the drivetrain 106.

The second wheel 144 may be positioned on the intermediate shaft 154 and may rotate relative thereto or may rotate therewith. The second wheel 144 may be drivably connected to the first wheel via the first belt 150 and may have a radius larger than the radius of the first wheel 142 to effect the first gearing stepdown. The second wheel 144 may also be configured to rotate with the third wheel 146.

The third wheel 146 may be positioned on the intermediate shaft 154 (or attached to the second wheel 144) and coaxially aligned with the second wheel 144. The third wheel 146 may be drivably connected to the fourth wheel 148 via the second belt 152 and may have a radius smaller than a radius of the fourth wheel 148 to effect a second gearing stepdown in the drivetrain 106.

The fourth wheel 148 may be connected to the output shaft 108 so that the output shaft 108 rotates therewith. The fourth wheel 148 may be drivably connected to the third wheel 146 via the second belt 152 and may have a radius larger than the radius of the third wheel 146 to effect the second gearing stepdown. The fourth wheel 148 may also include a locking aperture 158 configured to align with the locking aperture 130 of the cover 124 and the locking aperture 138 of the bearing plate 126 for locking the drivetrain 106, the purpose of which will be described below.

The first belt 150 may be a smooth belt, a timing belt (i.e., a toothed belt), a chain, a cable, or the like. The first belt 150 may be configured to be aligned in and retained by grooves of the first wheel 142 and the second wheel 144.

The second belt 152 may be a smooth belt, a timing belt (i.e., a toothed belt), a chain, a cable, or the like. The second belt 152 may be configured to be aligned in and retained by grooves of the third wheel 146 and the fourth wheel 148.

The output shaft 108 extends from the drivetrain chamber 118 through the output opening 122. The output shaft 108 may be connected to the fourth wheel 148 and the output lever 110 so that the output lever 110 rotates with the fourth wheel 148.

The bearings 156 may support and align with the drive shaft 140, the intermediate shaft 154, the output shaft 108, and the wheels 142, 144, 146, 148. Some of the bearings 156 may be positioned in openings of the housings 102, while other bearings 156 may be positioned in the bearing apertures 136 of the bearing plate 126. The bearings 156 may be radial bearings, thrust bearings, or any other suitable bearings. Alternatively, low-friction sleeves or materials may be used.

The output lever 110 may be connected to the output shaft 108 opposite the fourth wheel 148 externally from the housing 102 and may include a lever arm 160 and a friction interface 162. The output lever 110 may be configured to rotate with the fourth wheel 148 based on input from the stepper motor 104.

The lever arm 160 may include a proximal end 164 connected to the output shaft 108 and a distal end 166 including a connecting aperture 168 for connecting the lever arm 160 to a control rod.

Figure 2:
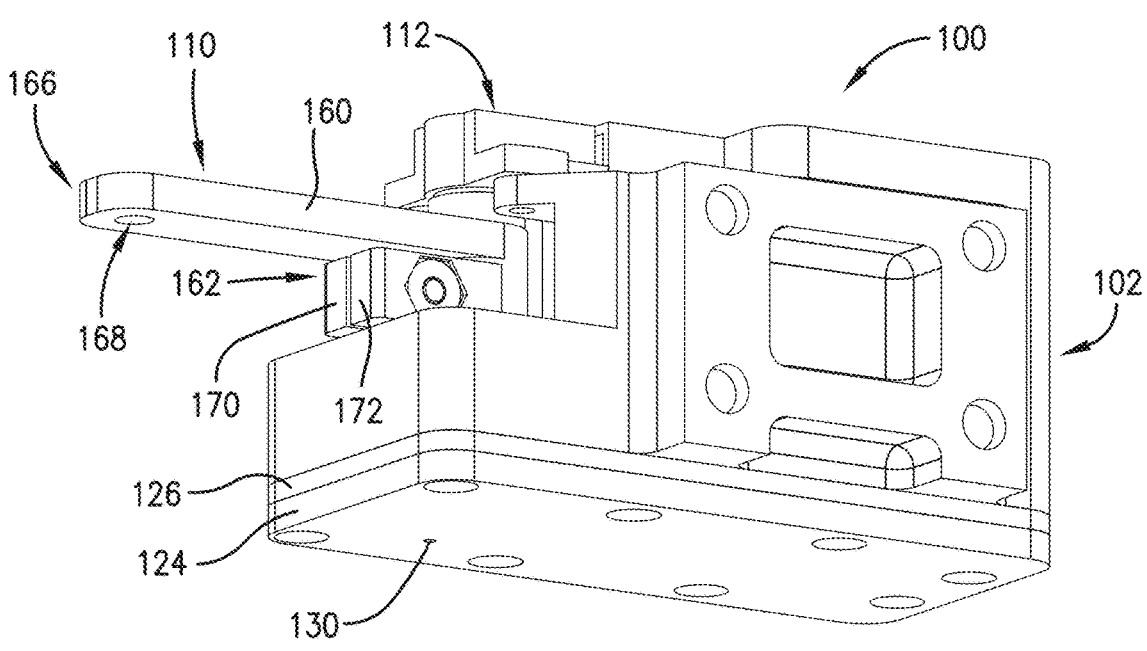
FIG. 2 is a bottom perspective view of the control servo of FIG. 1.
Figure 3:
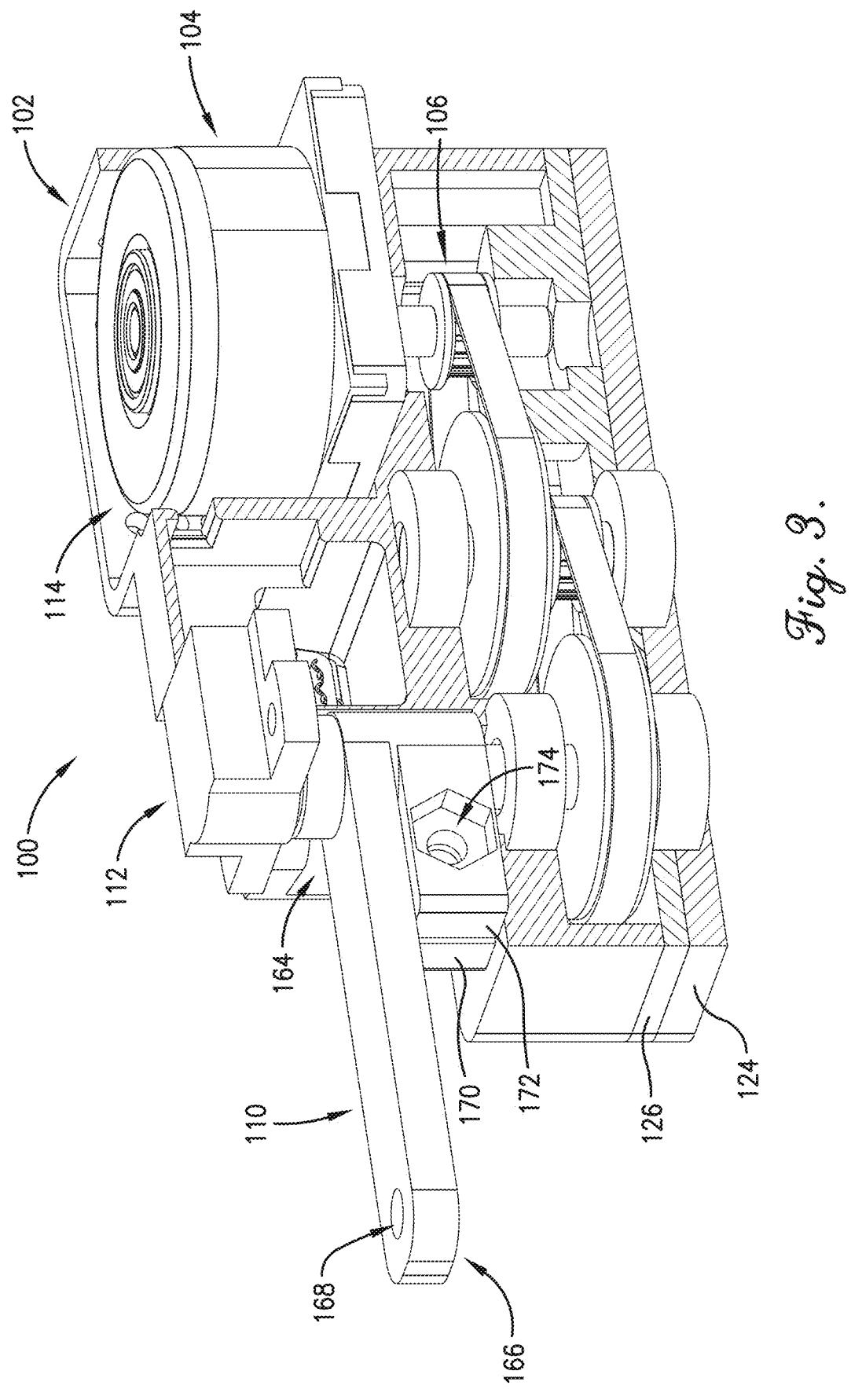
FIG. 3 is a cutaway perspective view of the control servo of FIG. 1.

As best seen in FIGS. 2 and 3, the friction interface 162 may be positioned near the proximal end 164 of the lever arm 160 for engaging the output shaft 108. The friction interface 162 may include first and second blocks 170, 172 each including a fastener aperture 174 for receiving a fastener 176 therein (as depicted in FIG. 1). At least one of the first block 170 and the second block 172 may be rigidly connected to the lever arm 160 while at least one of the first block 170 and second block 172 is configured to move relative thereto. Tightening of the fastener 176 in the fastener aperture 174 may draw the first block 170 and second block 172 together to increase a frictional connection of the output lever 110 on the output shaft 108, the purpose of which will be described below.

The position sensor 112 may be mounted to housing 102 near the output lever 110 and may be configured to detect a position of the output lever 110. The position sensor 112 may be a proximity sensor, a contact sensor, a Hall effect sensor, or the like. In one embodiment, the position sensor 112 may detect the position of the output lever 110 without contact the output lever 110.

The control servo 100 may also include an electronic/electrical connector 178 for providing electrical power and control signals to the stepper motor 104. Alternatively, the control servo 100 may include a transceiver for receiving control signals wirelessly.

Use of the control servo 100 will now be described in more detail. The stepper motor 104 may be communicatively connected to and controlled by the controller 180. The output lever 110 may be drivably connected to an engine input, a flight control, or the like via the connecting aperture 168 of the lever arm 160. Commands from the controller 180 may activate the stepper motor 104, which in turn may drive the output lever 110 via the drivetrain 106 and hence effect control of the engine input, flight control, or the like. For example, the stepper motor 104 may turn with $\frac{1}{4}^{th}$ step resolution and an output force of approximately 3 pounds, with the drivetrain 106 turning at a 6:1 gear ratio or any other suitable ratio to meet output torque and rate requirements. The position sensor 112 may provide output position sensing for monitoring performance of the control servo 100.

Advantageously, the drivetrain 106 may provide zero backlash, and the output lever 110 may exert a passive state backdrive force (e.g., less than 4 ounces) on the stepper motor 104 via the drivetrain 106 when the control servo 100 is not engaged. This may be realized at least in part by the specific components of the drivetrain 106. The bearings 156 also may minimize friction in the drivetrain 106. These improvements may all facilitate more concise and accurate control.

The output lever 110 may be configured to slip on the output shaft 108 for certain conditions. For example, if for any reason control of the stepper motor 104 is faulty, or if components of the control servo 100 do not operate as intended, the output lever 110 may pivot relative to the output shaft 108, which allows manual control of the engine, flight control, or the like without being encumbered by the control servo 100. In effect, output lever 110 may thus be backdriven (i.e., flow of driving cause and effect is reversed) by the manual control of the engine, flight control, or the like. A slip friction threshold of the friction interface 162 may be between approximately 5 pounds and approximately 10 pounds and may be adjusted as desired by tightening or loosening the fastener 176 in the fastener aperture 174, thereby drawing the blocks 170, 172 closer to or farther away from each other over the output shaft 108.

The position sensor 112 may also provide, via its output position sensing, indications of slip between the output shaft 108 (and hence the stepper motor 104) and the output lever 110. To that end, control inputs to or performance of the stepper motor 104 may be compared against output of the position sensor 112 via the controller 180. Unbalanced movement of one compared to the other may indicate slip.

The slip friction threshold (or the ability to slip in general) may be tested by inserting a locking member through the locking apertures 130, 138, 158 of the cover 124, bearing plate 126, and fourth wheel 148, respectively. This immobilizes the drivetrain 106 and the stepper motor 104. A force may then be exerted on the output lever 110 until the output lever 110 slips on the output shaft 108. The force at the point of slippage may be observed to denote the slip friction threshold. The slip friction threshold may then be adjusted as described above.

The above-described invention provides several advantages. For example, the drivetrain 106 may provide zero backlash and may provide a lower passive state backdrive force. These improvements may facilitate more concise and accurate control. The output lever 110 may also provide an adjustable slip friction threshold via the friction interface 162, thus allowing manual control bypassing the control servo 100. The slip friction threshold may also be tested and adjusted via the locking apertures 130, 138, 158.

The drivetrain 106 is more compact than prior art drivetrains, and the housing 102 (including the cover 124 and bearing plate 126), the output lever 110, and other components may be formed via additive manufacturing utilizing materials that support certification. Such construction also allows a more complex and compact control servo 100 that reduces installation space needed and build cost.

Additional Considerations

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A control servo for an aircraft engine control system, the control servo comprising:
    a stepper motor including a drive shaft;
    a drivetrain drivably connected to the drive shaft;

an output shaft drivably connected to the drivetrain and having a longitudinal axis, wherein the drivetrain is configured to drivably connect the drive shaft and the output shaft; and
    an output lever including:
        an output lever arm having opposing proximal and distal ends, the output lever being configured to be connected to the output shaft near the proximal end so as to be rotatable with the output shaft; and
        a friction interface near the proximal end and configured to be adjusted to set a slip friction threshold between the output lever and the output shaft,
        wherein the friction interface is configured to have a constant length in a direction of the longitudinal axis of the output shaft during adjustment of the friction interface.

2. The control servo of claim 1, wherein the friction interface includes opposing first and second blocks and a fastener configured to draw the second block toward or away from the first block.

3. The control servo of claim 2, wherein the first block is integral with the output lever arm.

4. The control servo of claim 1, wherein the slip friction threshold can be set to between approximately five pounds and approximately ten pounds of force.

5. The control servo of claim 1, wherein the control servo has a backdrive force of less than four ounces to the stepper motor.

6. The control servo of claim 1, further comprising a position sensor near and spaced from the proximal end of the output lever for detecting a position of output lever.

7. The control servo of claim 1, wherein the drivetrain is configured to be locked in place for testing the slip friction threshold between the output lever and the output shaft.

8. The control servo of claim 7, wherein the control servo further comprises a housing including a first aperture, the drivetrain includes a wheel having a second aperture, and the first aperture and the second aperture are configured to be aligned for receiving a locking member therethrough for locking the drivetrain.

9. The control servo of claim 8, wherein the housing includes a removable cover, the first aperture extending through the removable cover.

10. The control servo of claim 9, further comprising a bearing support plate including a third aperture, wherein the first aperture, the second aperture, and the third aperture are configured to be aligned for receiving the locking member therethrough for locking the drivetrain.

11. A control servo for an aircraft engine control system, the control servo comprising:
    a housing including:
        a drivetrain chamber;
        a drive opening connected to the drivetrain chamber; and
        an output opening connected to the drivetrain chamber and spaced from the drive opening;
    a stepper motor including a drive shaft configured to extend through the drive opening into the drivetrain chamber;
    a drivetrain at least partially positioned in the drivetrain chamber, the drivetrain including:
        a first wheel configured to be connected to the drive shaft so as to be rotatable therewith;
        a second wheel spaced from the first wheel;
        a third wheel near the second wheel and configured to be rotatable therewith;
        a fourth wheel spaced from the third wheel;

a first belt drivably connecting the first wheel and the second wheel; and a second belt drivably connecting the third wheel and the fourth wheel;

an output shaft configured to extend through the output opening from the drivetrain chamber and configured to be connected to the fourth wheel so as to be rotatable therewith, the drivetrain being configured to drivably connect the drive shaft and the output shaft with no backlash between the drive shaft and the output shaft; and an output lever including:

an output lever arm having opposing proximal and distal ends, the output lever being configured to be connected to the output shaft near the proximal end so as to be rotatable with the output shaft; and a friction interface near the proximal end and configured to be adjusted to set a slip friction threshold between the output lever and the output shaft, wherein the friction interface is configured to have a constant length in a direction of the longitudinal axis of the output shaft during adjustment of the friction interface.

12. The control servo of claim 11, wherein the first belt and the second belt are toothed belts and the first wheel, the second wheel, the third wheel, and the fourth wheel are sprockets.

13. The control servo of claim 11, wherein the drivetrain provides a six to one gear ratio between the drive shaft and the output shaft.

14. The control servo of claim 11, wherein the slip friction threshold can be set to between approximately five pounds and approximately ten pounds of force.

15. The control servo of claim 11, wherein the control servo has a backdrive force of less than four ounces to the stepper motor.

16. The control servo of claim 11, wherein the drivetrain is configured to be locked in place for testing a slip friction threshold between the output lever and the output shaft.

17. The control servo of claim 16, wherein the housing includes a first aperture, the fourth wheel includes a second aperture, and the first aperture and the second aperture are configured to be aligned for receiving a locking member therethrough for locking the drivetrain.

18. A control servo for an aircraft engine control system, the control servo comprising:

a housing including a first aperture;

a stepper motor including a drive shaft;

a drivetrain drivably connected to the drive shaft and including a wheel having central rotational axis and a second aperture offset from the central rotational axis;

an output shaft drivably connected to the drivetrain, wherein the drivetrain is configured to drivably connect the drive shaft and the output shaft; and an output lever including:

an output lever arm having opposing proximal and distal ends, the output lever being configured to be connected to the output shaft near the proximal end so as to be rotatable with the output shaft; and a friction interface near the proximal end and configured to be adjusted to set a slip friction threshold between the output lever and the output shaft, wherein the drivetrain is configured to be locked in place for testing the slip friction threshold between the output lever and the output shaft, the first aperture and the second aperture being configured to be aligned for receiving a locking member therethrough for locking the drivetrain.

19. The control servo of claim 18, wherein the housing includes a removable cover, the first aperture extending through the removable cover.

20. The control servo of claim 19, further comprising a bearing support plate including a third aperture, wherein the first aperture, the second aperture, and the third aperture are configured to be aligned for receiving the locking member therethrough for locking the drivetrain.

\* \* \* \* \*